United States Patent [19]

Marlowe et al.

[11] Patent Number: 5,006,833
[45] Date of Patent: Apr. 9, 1991

[54] SEWER LINE RESTRICTION ALARM PLACED IN CLEAN OUT PLUG

[75] Inventors: Edward D. Marlowe, Collinsville, Conn.; Christian P. Marlowe, Nederland, Colo.

[73] Assignee: CDF, Inc., Collinsville, Conn.

[21] Appl. No.: 385,587

[22] Filed: Jul. 25, 1989

[51] Int. Cl.⁵ .............................. G08B 21/00
[52] U.S. Cl. ......................... 340/611; 340/605
[58] Field of Search .......... 340/611, 605; 73/49.1, 73/715, 717

[56] References Cited

U.S. PATENT DOCUMENTS

| | | | |
|---|---|---|---|
| 1,164,882 | 12/1915 | Sommer | 340/620 |
| 2,761,037 | 8/1956 | Thomas et al. | 340/608 |
| 3,757,316 | 9/1973 | Fiorenzo | 340/608 |
| 3,774,187 | 11/1973 | Windham | 340/608 |
| 4,091,365 | 5/1978 | Allen | 340/608 |
| 4,392,128 | 7/1983 | Young et al. | 340/608 |
| 4,546,346 | 10/1985 | Wave et al. | 340/611 |

*Primary Examiner*—Joseph A. Orsino
*Assistant Examiner*—Jill Jackson
*Attorney, Agent, or Firm*—McCormick, Paulding & Huber

[57] ABSTRACT

A restricted flow alert for use in the access arm of the main clean-out plug location in a commercial or residential sewage system includes a diaphragm which moves in response to the presence of to close a switch and actuate an alarm. A pneumatic time delay prevents the alarm from being actuated in response to transient flow conditions in the sewer line and allows operation of the alarm at any physical orientation relative to the axis of the body of the restricted flow alert.

8 Claims, 2 Drawing Sheets

SEWER LINE RESTRICTION ALARM PLACED IN CLEAN OUT PLUG

BACKGROUND OF THE INVENTION

The present invention relates generally to apparatus for indicating the effluent carrying capacity of a sanitary sewer line and more particularly with apparatus for use with the main clean-out plug location to sense and provide an alarm in response to the detection of restricted discharge and actual blockage conditions in the sanitary sewer line.

It is well known that discharge restriction or blockage in sanitary sewer lines can cause back-up and overflow of effluent or other waste water into living and eating areas of a home or commercial establishment. Such overflow conditions are unhealthy and unsanitary and may bring bacteria or other potentially harmful germs and viruses into contact with humans. In addition, severe damage may occur to furniture, goods, structures, and the like due to flooding or contamination.

The ability to detect a blockage condition in a sewer pipe is well established. U.S. Pat. No. 465,278 to Lawler discloses an indicating device that is used in conjunction with a sewer pipe wherein sewer gas or water forces air into a sealed expandable chamber when the sewer pipe is blocked. The Lawler device requires special fittings to the sewer pipe and high water or gas pressure for activation. Generally, such high pressure conditions are only present when a complete blockage exists and its detection is too late to prevent an overflow. In addition to mechanical mounting arrangement and operational limitations, devices, such as Lawler's, only operate in given orientations, e.g. upright or other predetermined orientations.

There is no warning of deteriorating discharge conditions, such as those which occur with gradual build-ups in the sewer pipe causing a narrowing of the pipe diameter. If such a deteriorating condition is sensed prior to a complete blockage, remedial corrective action can be taken before an overflow condition occurs thereby preventing damage and avoiding an unhealthy and unsanitary condition due to the overflow.

One measure commonly employed to prevent the gradual build-up into a blockage condition is the use of chemicals which act upon the built-up matters to remove or dissolve them. Homeowners and maintenance personnel tend to use excessive amounts of such chemicals which may be potentially dangerous to a user and may also pose environmental problems. The storage of these chemicals also poses a hazard to children who may accidentally ingest them and poison themselves or burn their skin or internal mucous membranes.

The present invention eliminates the needless use and storage of potentially dangerous and environmentally unsafe or unsound chemicals by anticipating a blockage condition before it occurs.

It is a general aim of the present invention therefore to provide an early warning sensor and alarm apparatus for use with a residential and commercial sanitary sewer line that is environmentally safe and which overcomes the limitations of known devices.

It is another aim of the present invention to provide apparatus that detects a gradual deteriorating discharge condition in a residential and commercial sanitary sewer line and which provides an alarm upon sensing such a condition.

It is a further aim of the present invention to provide sensing and alarm apparatus for use with the main clean-out plug location of standard code sanitary sewer lines without the necessity of special or customized connections.

It is yet a further aim of the present invention to provide sensing and alarm apparatus that differentiates between restricted discharge and blockage conditions and transient discharge conditions.

SUMMARY OF THE INVENTION

In accordance with the present invention, an early warning sensor and alarm device for use in place of the clean-out plug at the main clean-out plug location in a sanitary sewer line in a residential or commercial structure is presented. The early warning sensor and alarm device is contained within a generally cylindrically shaped housing that has a size and shape in conformance with code standard plumbing such that the device is threadable into the access arm in place of the usual clean-out plug at the main clean-out plug location in the sanitary sewer line to seal the access arm. An articulated or pre-involuted diaphragm is hermetically sealed to an outer face of the device to form an inner chamber. In one embodiment of the invention, the inner surface of the articulated diaphragm carries a metallic contact closure film which moves with the diaphragm and into physical connection with axially mounted electrical contacts that extend through the body portion into the chamber. A printed circuit card has corresponding circuit points that are in registration with the electrical contacts such that the metallic closure film carried by the articulated diaphragm provides electrical continuity between the contacts and accordingly completes the electrical circuit path on the printed circuit board. When the surface of the articulated diaphragm moves in response to fluid the presence of applied to the diaphragm, either directly or through an air pocket, when the device is located in the access arm in place of the clean-out plug, the completion of the electrical circuit path causes alarm circuitry contained on the printed circuit card to respond and provide an audible or visual alarm.

In accordance with another aspect of the invention, an orifice is provided in the chamber which regulates the rate at which air may be discharged from the chamber due to movement of the surface of the articulated diaphragm and serves as a time delay to mask out responses to transient flow conditions such as falling water in the sanitary sewer line.

The early warning sensor and alarm device of the present invention operates in such a manner as to indicate various drainage conditions of an associated sanitary sewer line of the sewage system. An alarm that is present for a short duration is indicative of a slightly restricted system whereas a much longer or continuous alarm is indicative of a substantially restricted or completely blocked sewage system. Since the early warning sensor and alarm device provides a distinction between a slow draining or restricted system and a blocked system, corrective attention may be given prior to the actual backup and flooding of the residence or commercial structure.

BRIEF DESCRIPTION OF THE DRAWINGS

Other features and advantages of the present invention will become readily apparent from the following written description and drawings wherein.

DETAILED DESCRIPTION OF THE PREFERRED EMBODIMENTS

Figure 1:
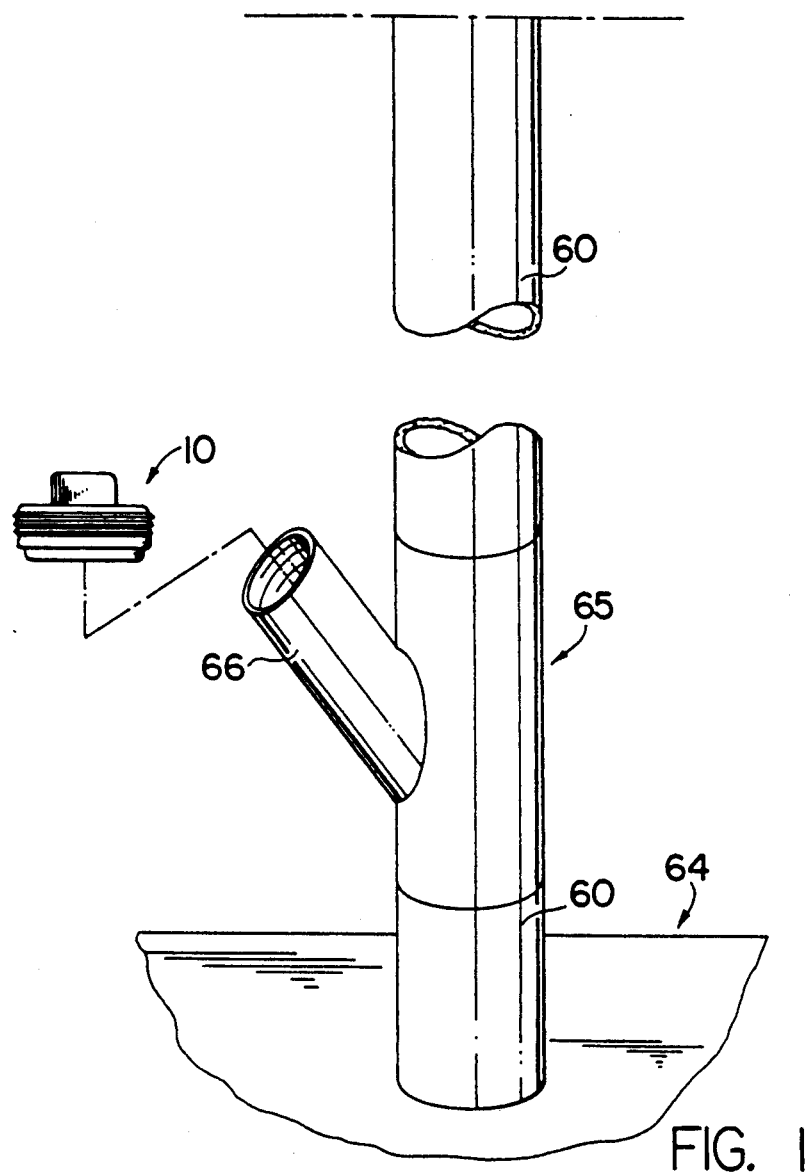
FIG 1 is a perspective view of the early warning sensor and alarm device of the present invention shown as it might typically be connected to the access arm in place of the clean-out plug at the main clean-out plug location in a sanitary sewer line.

Turning now to the drawings and considering FIG. 1, the residential and commercial Sanitary Sewer Line Early Warning Sensor and Alarm embodying the present invention is illustrated therein and generally designated 10. For purposes of the following description, the invention will be referred to as a "restricted flow alert", it being understood that no limitations are inferred or intended by such reference.

It should be noted that in the preferred embodiment, the restricted flow alert 10 has the general shape and configuration of a code standard clean-out plug of the general type used with residential and commercial sanitary sewer disposal systems. Typically, the clean-out plug threads into one arm of a Y or straight section of the sanitary sewer line, the remaining two arms of the section being in series with the sewer line. Although FIG. 1 illustrates a Y-section at the main clean-out plug location, it will be recognized by those skilled in the art that the Y-section may be U-shaped, straight, T-section or any other configuration used in the trade for clean-out access. The main function of the clean-out plug is to permit access to the sewer line so that blockages or other obstructions may be removed or loosened and carried away. Generally, a "snake" is inserted into the clean-out access. The conformance of the restricted flow alert 10 to a code standard clean-out plug eliminates the need for special fittings or other custom arrangements to connect the restricted flow alert 10 of the present invention to a sanitary sewer line. In normal operating conditions, the main clean-out plug location has a plug to seal the pipe and to prevent odor from entering the residence or commercial establishment. It should be understood that the restricted flow alert 10 can be of any size and shape and is not limited to the embodiment disclosed herein. The restricted flow alert may be made of any suitable material, however, PVC or other suitable plastic material is preferable due to its ease of formation and relative immunity to corrosion.

Still referring to FIG. 1, the restricted flow alert 10 is shown as it might typically be connected to the Y-section 65 of a sanitary sewer line 60. The Y-section 65 is generally located near the portion of the sanitary sewer line that exits the residential or commercial structure to discharge waste water or effluent to a sewage system 64. The sewage system 64 could be for example, an on-site septic tank or an off-site sewer system. The Y-section 65 has a threaded access arm 66 so that a clean-out plug of like shape and threading may be screwed into the access arm to seal it closed. The restricted flow alert 10 is installed by threading it into the opening in the access arm 66 in place of the normal clean-out plug. When installed in this fashion, the sensing side of the restricted flow alert 10, as described below, faces the interior of the sanitary sewer line 60.

Figure 2:
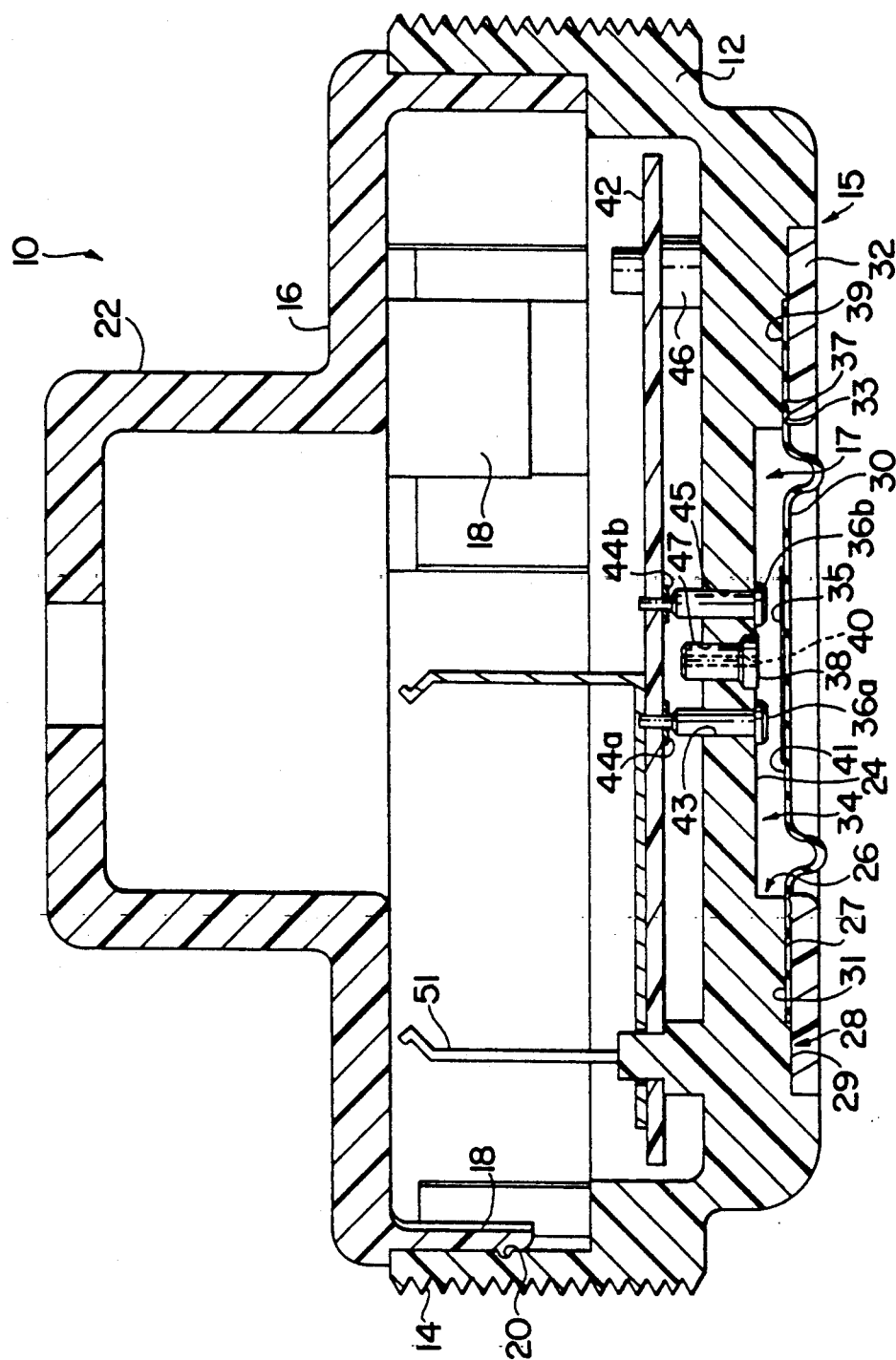
FIG. 2 is a side sectional view of the early warning sensor and alarm device of FIG. 1.

Referring now to FIG. 2, the restricted flow alert 10 has a cylindrically shaped body 12 with threads 14 on the circumferential surface of the body along the outside diameter portion. At one end transverse to the body's axis of rotation, there is a face 15. A cap or cover 16 fits into and is engaged with the body 12 by means of several pawls 18 on the cap that snap into corresponding detents 20 along the inner circumferential surface portion to secure the cap to the body and to prevent relative motion between the cap and body. The cap 16 has a square drive protrusion 22 of a standard dimension. When the cap 16 and the body 12 are joined together by snapping the pawls 18 into the detents 20, the resulting assembly can be tightened or loosened into an access arm with a wrench engaged with the square drive protrusion 22. Although a square drive and cap have been described, it will be recognized by those skilled in the art that other means for tightening the restricted flow alert 10 into the access arm may be employed.

The restricted flow alert 10 has a face 15 disposed at its side opposite the cap 16. The face 15 has a recessed portion 17 and an inner recessed surface 24 and stepped coaxial bands 26 and 28 having surfaces 27 and 29, respectively. An articulated or pre-involuted diaphragm 30 has a diameter substantially equal to the outer diameter of the coaxial band 26 and is received in the recessed area formed by the stepped coaxial band 26 with the inner surface 31 of the articulated diaphragm 30 contacting the surface 27 of the band 26. The diaphragm is hermetically sealed to the surface 27 by a coaxial retaining ring 32 that sealingly urges the surface 31 of the diaphragm against the surface 27. The retaining ring 32 also has coaxial ridges 33, 37 along its inner surface 39 which displace the diaphragm material to ensure that the diaphragm 30 is sealed to the surface 27. The retaining ring 32 is attached by adhesive or means such as heat staking or welding or other methods well known to those skilled in the art. It can be seen that by mounting the articulated diaphragm 30 in the above manner, a variable volume chamber 34 is formed in the face 15 of the body 12 wherein the articulated diaphragm will be displaced inwardly in response to the presence of fluid either directly at the diaphragm or through an air pocket.

In the embodiment disclosed, the articulated diaphragm 30 also includes a switch closure film 35 attached to the inner surface 41 of the diaphragm 30 within the chamber 34 and moves in the axial direction with the diaphragm surface. The switch closure film 35 is made of an electrically conductive material such as silver or nickel which material also resists corrosion during long term exposure to moderate or high humidity levels. The switch contact closure film 35 provides electrical continuity to activate the alarm of the restricted flow alert 10 when a fluid presence urges the diaphragm 30 into the chamber 34 as described below.

Two spaced apart electrical contacts 36a and 36b extend axially through openings 43, 45 respectively in the body 12 and into the chamber 34. The contacts 36a and 36b are installed with an airtight fit to prevent air leaking from the chamber 34 past the contact body. The contacts 36a and 36b are located in chamber 34 so that no physical contact exists with the switch closure film 35 when the articulated diaphragm 30 is in an at rest or normal state. However, the contacts 36a and 36b extend into the chamber 34 a sufficient distance, to provide a gap corresponding to a desired travel of the surface of the articulated diaphragm 30. Therefore, the switch closure film 35 makes contact between the contacts 36a and 36b and provides the necessary electrical continuity when the surface of the articulated diaphragm travels the required distance. Although a switch comprising the closure film 35 and contacts 36a and 36b is described, it will be recognized that numerous devices and arrangements including optical, mechanical, proximity and other types of devices may be used to perform the switch continuity function.

A feature of the restricted flow alert 10 prevents the articulated diaphragm 30 from responding to transient fluid presence conditions and thereby preventing false alarm alerts. An air throttle 38 is axially mounted in an opening 47 in the body 12 and which air throttle provides communication between the interior and exterior of the chamber 34. The air throttle 38 has a small orifice 40 extending axially throughout its length and as can be seen in FIG. 2, the orifice 40 extends from the chamber 34 to an interior cavity formed by the body 12 and the cap 16 and hence to atmospheric pressure. The orifice 40 provides a dampening effect by restricting the exit of air from the chamber 34 and which air is displaced by movement of the articulated diaphragm 30 from its at rest or normal state. The surface of the articulated diaphragm 30 and switch closure film 35 moves toward the contacts 36a and 36b at the rate at which air exits the chamber 34 through the orifice 40 and thus the response time may be controlled through selection of an air throttle having the necessary orifice diameter to provide the desired delay. It can be seen that sufficient time delay must be provided to "mask out" responses to transient conditions such as those that normally occur with falling water or temporary over capacity of the sanitary sewer line during high volume waste water discharges. When the closure delay time exceeds the time of these transient conditions no alarm sounds. Only when a steady state or semi-steady state fluid presence condition lasts long enough to move the surface of the articulated diaphragm carrying the switch closure film 35 against the contacts 36a and 36b to activate the alarm circuitry described below will an alarm sound. It can also be seen that the physical orientation of the air throttle 38 is not critical which allows the restricted flow alert 10 to be used at any angular orientation relative to the axis of the body 12 and the sanitary sewer line.

In the preferred embodiment disclosed, the "masking" time delay is provided pneumatically. The required "masking" time delay may also be provided electrically using a resistor-capacitor combination, timer or other means well known to those skilled in the art.

Figure 3:
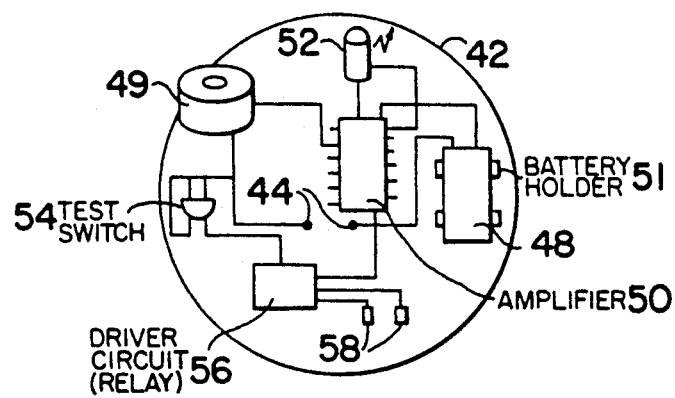
FIG. 3 is a perspective view of a printed circuit card containing electrical components of the electrical circuitry of the early-warning sensor and alarm device of FIG. 1.

Referring to FIGS. 2 and 3, the electrical components of the alarm circuitry are mounted on a printed circuit card 42 which is located within the cavity of the body 12 and cap 16. As illustrated in FIG. 2, the contacts 36a and 36b extend far enough into the cavity of the body 12 and are in registration with electrical contacts 44a and 44b on the printed circuit card 42 when the card is mounted in position in the cavity. The contacts 36a and 36b thus function as an open electrical switch for the alarm circuitry on the card 42. The open switch is electrically closed by the switch closure film 35 when the surface of the articulated diaphragm 30 moves inward sufficiently into engagement with the contacts thus providing electrical continuity for the alarm circuitry. The printed circuit card 42 is attached to the body 12 by means of fasteners that pass through the card 38 and into integral sockets 46 on the body. Numerous means for constraining the printed circuit card 42 are generally well known and understood by those skilled in the art.

The electrical components forming the alarm circuitry are generally well known in the art and typically used in such devices as fire and smoke alarms. As shown in FIG. 3, a typical alarm circuit may include components such as an electronic horn 49 powered by a battery 48 through an amplifier 50. The battery 48 is held in place by a battery holder 51. A light emitting diode (LED) 52 flashes intermittently to indicate that the battery 48 is charged and the card 42 is operational. A test switch 54 is also provided to sound the horn 49 for testing purposes. A driver circuit 56 such as a relay may be used to provide a switch closure across terminals 58, 58 to provide alarm signals to a remote location, perhaps one more convenient than the location in which the restricted flow alert is installed. In the illustrated embodiment, cap 16 is provided with openings for the horn 49, LED 52 and the test switch 54.

Regardless of the specific circuit design utilized, it is desirable that the restricted flow alert 10 have three functional operating states. In the first state, the horn 49, LED 52 and remote alarm signal switch closure are active when the switch closure film 35 is moved by the surface of the articulated diaphragm 30 against the contacts 36a and 36b. In the second state, the articulated diaphragm 30 is in its at rest or normal position and the switch closure film 35 does not touch the contacts 36a and 36b. In the second state, the horn 49 and remote alarm signal switch closure are also deactivated and the LED flashes intermittently. In the third state, the battery voltage has fallen to a threshold level low enough that replacement of the battery 48 would be desirable to insure reliable operation of the restricted flow alert. In the third state, the horn 49 sounds at a slow pulse to indicate the low battery voltage condition.

The duration of an alarm provided by the restricted flow alert 10 is indicative of the conditions within the sanitary sewer line 60. For example, in one condition wherein no restriction exists within the line 60, waste water and effluent travel freely through the line 60 to the sewage system 64. A very large amount of waste water discharged at once may cause water and effluent to momentarily back-up the access arm 66 and against the surface of the articulated diaphragm 30. However, an unblocked line 60 will remove the fluid presence at the articulated diaphragm 30 before enough air is expelled from the cavity 34 to allow the surface of the articulated diaphragm carrying the switch contact film 35 to engage the contacts 36a and 36b and sound the horn 49.

Another condition is characterized by the partial restriction of the sanitary line. Waste water and effluent will back up the access arm 66 for a sufficient amount of time to provide a fluid presence at the articulated diaphragm 30 to force the air from the chamber 34 so that the surface of the diaphragm carrying the switch contact film 35 moves the contact film against the contacts 36a and 36b thereby activating the alarm circuitry and causing the horn 49 to sound. The amount of time the horn 49 sounds is indicative of the degree of restriction within the line 60 since the horn will sound for shorter periods the faster the waste water drains away. A short sounding indicates that the line 60 is relatively unclogged but that some attention is necessary in the near future. A longer sounding indicates a more serious restriction is developing. Correspondingly, a continuous sounding of the horn 49 indicates that the line 60 is for all intents and purposes blocked and that immediate action is advisable.

It is interesting to note that the restricted flow alert 10 will thus map the development of a major blockage in the sanitary sewer line. In the beginning, when the restriction is minor, the horn 49 sounds for only a few seconds. As the restriction worsens, the horn 49 sounds for several seconds or minutes. Finally, when the system is completely blocked, the horn sounds continuously.

A residential and commercial sanitary sewer line early warning sensor and alarm for use in the main clean-out plug location in the sewer line has been described above. It will be understood that numerous modifications and substitutions may be made without departing from the spirit and scope of the invention. Therefore, the invention has been described by way of illustration rather than limitation.

The invention claimed is:

1. In combination with the main clean-out plug location in a sanitary sewer line in a residential or commercial building structure, an early warning sensor and alarm device for indicating the flow conditions of the sewer line, said device comprising:

means for coupling said device to the main clean-out plug location, said device having a generally cylindrically shaped housing including a body portion and a cap portion, said body portion having a face and a recessed portion;

means for sensing and responding to the presence of a fluid at the device, said sensing and responding means having a normal, at-rest state, said normal state corresponding to a non-restricted flow condition in the sewer line and an operative state, said operative state corresponding to a restricted flow condition in the sewer line, said fluid presence sensing and responding means including a diaphragm having a shape and size larger than said recessed portion, said diaphragm being hermetically sealed to said body portion to cover said recessed portion to form a variable volume chamber, said diaphragm having one surface facing inwardly into said chamber and another surface forming an integral portion of said face, said diaphragm being displaced inwardly into said chamber in the presence of a fluid at said another surface;

alarm means responsive to said fluid presence sensing and responding means for providing an alarm signal in response to said fluid presence sensing and responding means being operated to its operative state, said alarm responsive means further comprises switch means extending axially from said body portion into said chamber and forming two terminals;

electrical contact means mounted to said one surface of said diaphragm for movement with said one surface of said diaphragm so that motion of said one surface of said diaphragm in response to the presence of fluid upon said another surface of said diaphragm causes said electrical contact to move means into physical contact with said terminals of said switch means thereby providing a continuous electrical path through said switch means, said response time delay means further comprises orifice means for providing air communication between said chamber formed by said diaphragm and said recessed portion and an interior cavity formed between said body portion and said cap, said orifice means restricting the air discharge rate from said chamber in response to a reduction in the volume of said chamber in response to axial movement by said diaphragm, said restricting means dampening said diaphragm motion and effecting a response time delay.

2. An early warning sensor and alarm device as defined in claim 1 wherein said housing is of a size and shape conforming to code standard plumbing.

3. An early warning sensor and alarm device as defined in claim 2 wherein said means for coupling said device to said main clean-out plug location includes said housing having threads along the outer circumferential body portion, said device being screwed into an access arm of the main clean-out plug location, said access arm further having code standard plumbing dimensions.

4. An early warning sensor and alarm device as defined in claim 3, wherein said cap portion is detachably engaged with said body portion and further includes means for screwing and tightening said housing into said access arm, said cap portion being removable to provide access to said alarm responsive means from a side of the device opposite the sewer line side of the device whereby the interior of the device is accessible without removal from the clean-out plug.

5. An early warning sensor and alarm as defined in claim 1 further including at least one of visual alarm means and audible alarm means, and means for powering said audible and visual alarm means.

6. An early warning sensor and alarm as defined in claim 5 wherein said alarm means further includes means for connecting a remote alarm to said alarm means.

7. An early warning sensor and alarm as defined in claim 6 wherein said alarm means further includes means for intermittently operating one of said audible and visual alarm means in response to the power in said powering means dropping below a threshold power level.

8. In combination with the main clean-out plug location in a sanitary sewer line in a residential or commercial building structure, an early warning sensor and alarm device for indicating the flow conditions of the sewer line, said device comprising:

a generally cylindrically shaped housing including a body portion and a cap portion, said body portion having a face and a recessed portion;

means for coupling said device to the main clean-out plug location;

means for sensing and responding to the presence of a fluid at the device, said sensing and responding means having a normal, at-rest state, said normal state corresponding to a non-restricted flow condition in the sewer line, and an operative state, said operative state corresponding to a restricted flow condition in the sewer line, said fluid presence sensing and responding means further comprising a diaphragm having a shape and size larger than said recessed portion and being hermetically sealed to said body portion to cover said recessed portion to form a variable volume chamber, said diaphragm having one surface facing inwardly into said chamber and another surface forming an integral portion of said face;

alarm means responsive to said fluid presence sensing and responding means for providing an alarm signal in response to said fluid presence sensing and responding means being operated to its operative state, said alarm responsive means further comprising switch means extending axially from said body portion into said chamber and forming two terminals and electrical contact means mounted to said one surface of said diaphragm for movement with said one surface of said diaphragm so that motion of said one surface of said diaphragm in response to the presence of fluid upon said another surface of said diaphragm causes said electrical contact means to move into physical contact with said terminals of said switch means thereby providing a continuous electrical path through said switch means, and means for delaying the response of said sensing and responding means to a fluid presence condition at the device "to mask out" transient flow conditions, said response time delay means further comprising orifice means for providing air communication between said chamber formed by said diaphragm and said recessed portion and an interior cavity formed between said body portion and said cap, said orifice means restricting the air discharge rate from said chamber in response to a reduction in the volume of said chamber in response to axial movement by said diaphragm, said restricting means dampening said diaphragm motion and effecting a response time delay.

* * * * *